United States Patent [19]

Ikedo

[11] Patent Number: 5,831,590
[45] Date of Patent: Nov. 3, 1998

[54] COMPOSITE PICTURE EDITING DEVICE

[75] Inventor: Tatsuhiro Ikedo, Nagoya, Japan

[73] Assignee: Brother Kogyo Kabushiki Kaisha, Aichi-ken, Japan

[21] Appl. No.: 878,970

[22] Filed: Jun. 19, 1997

[30] Foreign Application Priority Data

Jun. 20, 1996 [JP] Japan ..................................... 8-180080

[51] Int. Cl.$^6$ .................................................. G09G 5/00
[52] U.S. Cl. ........................... 345/113; 345/115; 345/435
[58] Field of Search .................................. 345/113, 114, 345/115, 435, 112, 163, 145, 146, 157, 340, 352

[56] References Cited

U.S. PATENT DOCUMENTS

| | | | |
|---|---|---|---|
| 4,731,743 | 3/1988 | Blancato | 345/435 |
| 4,823,285 | 4/1989 | Blancato | 345/435 |
| 5,289,568 | 2/1994 | Hosoya et al. | 345/435 |
| 5,375,195 | 12/1994 | Johnston . | |
| 5,490,245 | 2/1996 | Wugofski . | |
| 5,537,662 | 7/1996 | Sato et al. | 345/435 |
| 5,568,599 | 10/1996 | Yoshino et al. | 345/435 |

FOREIGN PATENT DOCUMENTS

| | | |
|---|---|---|
| 584759A2 | 3/1994 | European Pat. Off. . |
| 609559A2 | 8/1994 | European Pat. Off. . |
| 9408311 | 4/1994 | WIPO . |

*Primary Examiner*—Xiao Wu
*Attorney, Agent, or Firm*—Kane, Dalsimer, Sullivan, Kurucz Levy, Eisele and Richard, LLP

[57] ABSTRACT

Disclosed is a composite picture processing device for processing a composite picture consisting of a plurality of picture components. In the composite picture processing device, when a plurality of candidate patterns of one of the picture components is displayed, currently selected patterns for the other picture components is combined to each of the candidate patterns. Further, a mouse is provided to select one of the candidate patterns displayed.

17 Claims, 7 Drawing Sheets

COMPOSITE PICTURE EDITING DEVICE

BACKGROUND OF THE INVENTION

The present invention relates to a composite picture editing device for composing a plurality of components on a display.

Conventionally, composite picture editing devices are known. In such a device, a display such as a CRT (Cathode Ray Tube) display is provided, and on the display, a plurality of picture components such as a nose component, a mouth component, a hair component, an outline of a face component, or the like are composed to form a complete composite picture. In this case, for each component, a plurality of candidates patterns are prepared, and an operator of the device is required to scroll a displayed image of the candidate patterns to find a desired pattern to be used.

In the conventional composite picture editing devices, generally, only one candidate pattern is displayed on a screen of the display at a time, and in order to determine the desired candidate, the operator has to scroll the screen repeatedly. Thus, selection of a candidate pattern takes time, and it is very troublesome to use such a device.

To ease the operation, there is suggested a device which displays a plurality of candidate patterns on a screen at a time, and allows the operator to select one of the displayed candidates from among the patterns simultaneously displayed. In such a device, the operator can find the desired candidate quickly. However, there still remains a problem. Although the operator can select a desired candidate from among the displayed plurality of candidate patterns, the candidate patterns displayed simultaneously are of the same component, i.e., different images related to the same component, and the operator cannot view the resultant image until all the components are selected and a composite picture is composed. In such a device, the operator is sometimes required to perform the similar operations until the desired image is obtained.

SUMMARY OF THE INVENTION

It is therefore an object of the invention to provide an improved composite picture editing device in which a desired candidate for each component can be selected easily, with a simple operation.

For the above object, according to the invention, there is provided a composite picture editing device for processing a composite picture consisting of a plurality of components, at least one of the components having a plurality of candidate patterns, one of the plurality of candidate patterns being selected to compose the composite picture, the composite picture editing device comprising: a display; an image combining system, which generates a plurality of combined images by combining image of each of the plurality of patterns for the at least one of the components with currently selected patterns for the other components, the plurality of combined images corresponds to the plurality of combined images; a controller, which controls the display to simultaneously display the plurality of combined images; and a selector which is manually operated to select one of the combined images displayed on the display.

With the device configured as above, the operator can easily select a pattern since each candidate pattern is combined with the other components.

Optionally, all of the plurality of components respectively may have a plurality of candidate patterns, one of the plurality of candidate patterns for each component being selected to compose the composite picture.

In this case, the image combining system may generate a plurality of combined images by combining image of each of the plurality of patterns for only one of the components with currently selected patterns for the other components at a time.

Preferably, the plurality of patterns for each of the plurality of components includes a null image pattern containing no images. When a candidate pattern for a certain component is selected, if the null image pattern is selected for each of the other component, only the candidate patterns are displayed as in the conventionally device.

Further optionally, the selector may comprise a manually movable mouse and a mouse pointer displayed on the display, the mouse pointer being moved on any one of the combined images displayed on the display as the mouse is moved.

Still optionally, the controller may control the display to display the composite image consists of currently selected candidate patterns for the plurality of components.

Further, the controller can display scroll bars corresponding to the plurality of components, wherein when one of the scroll bars is operated, currently selected candidate pattern of the composite picture corresponding to the operated ones of the scroll bars are replaced with another candidate pattern.

Further preferably, the composite picture editing device can edit a plurality of categories of composite pictures, a plurality of different sets of components being provided corresponding to the plurality of categories.

According to another aspect of the invention, there is provided a composite picture processing device for processing a composite picture consisting of a plurality of picture components, each of the plurality of picture components having a plurality of candidate patterns, the composite picture consisting of selected patterns of the plurality of the candidate patterns for the plurality of picture components, the composite picture processing device comprising: a display; an image combining system, which generates a plurality of combined images by combining the plurality of candidate patterns for one of the plurality of picture components subjected to a selection with currently selected candidate patterns for each of the plurality of picture components which are not subjected to a selection; a controller, which controls the display to simultaneously display the plurality of combined images generated by the image combining system; and a selector which is manually operated to select one of the combined images displayed on the display.

According to further aspect of the invention, there is provided a method of displaying a plurality of candidate patterns for one of a plurality of components composing a composite picture for an operator to select, the composite picture consisting of the plurality of components, the method comprising: obtaining a first image data of the image pattern selected for each of the plurality of components except the one of the plurality of components; obtaining an image data for each of the plurality of candidate patterns for the one of the plurality of components; combining the first image data with each of the image data of each of the one of the candidate patterns; and displaying the candidate patterns, each of which having been combined with the first image data.

Optionally, in the method, the plurality of candidate patterns for each of said plurality of components may include a null image pattern containing no images.

Further optionally, the composite picture includes pictures at a plurality of categories, wherein the plurality of candidate patterns include a plurality of candidate patterns for the plurality of categories, and the step of obtaining the second image data for each of the plurality of candidate patterns may obtain the second image data for the plurality of categories randomly.

Still optionally, the step of obtaining the first image data of said image pattern may include a step of selecting the plurality of components from among candidate patterns for the plurality of categories randomly.

DESCRIPTION OF THE EMBODIMENT

Figure 1:
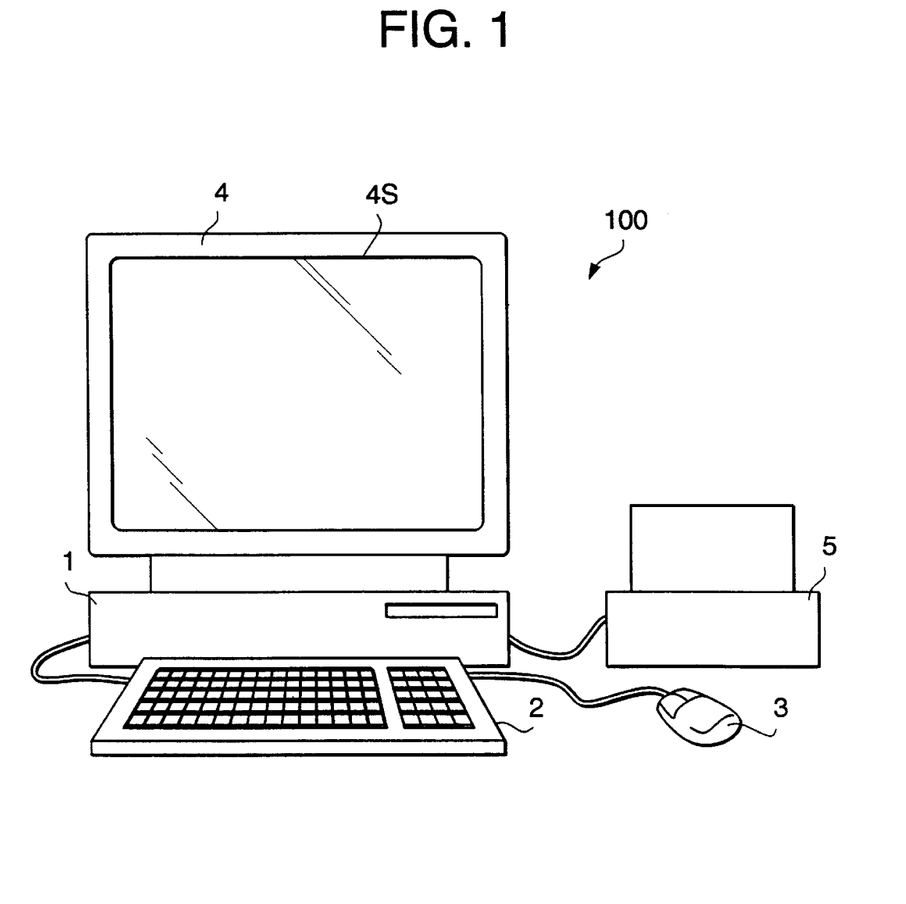
FIG. 1 is a schematic front view of a composite picture editing device embodying the present invention.

FIG. 1 is a schematic front view of a composite picture editing device 100 embodying the present invention. The composite picture editing device 100 includes a main body 1, a keyboard 2 which is connected to the main body 1 via an interface I/F, a mouse 3, a display 4. A printer 5 is also connected to the main body 1 via the interface I/F.

Figure 2:
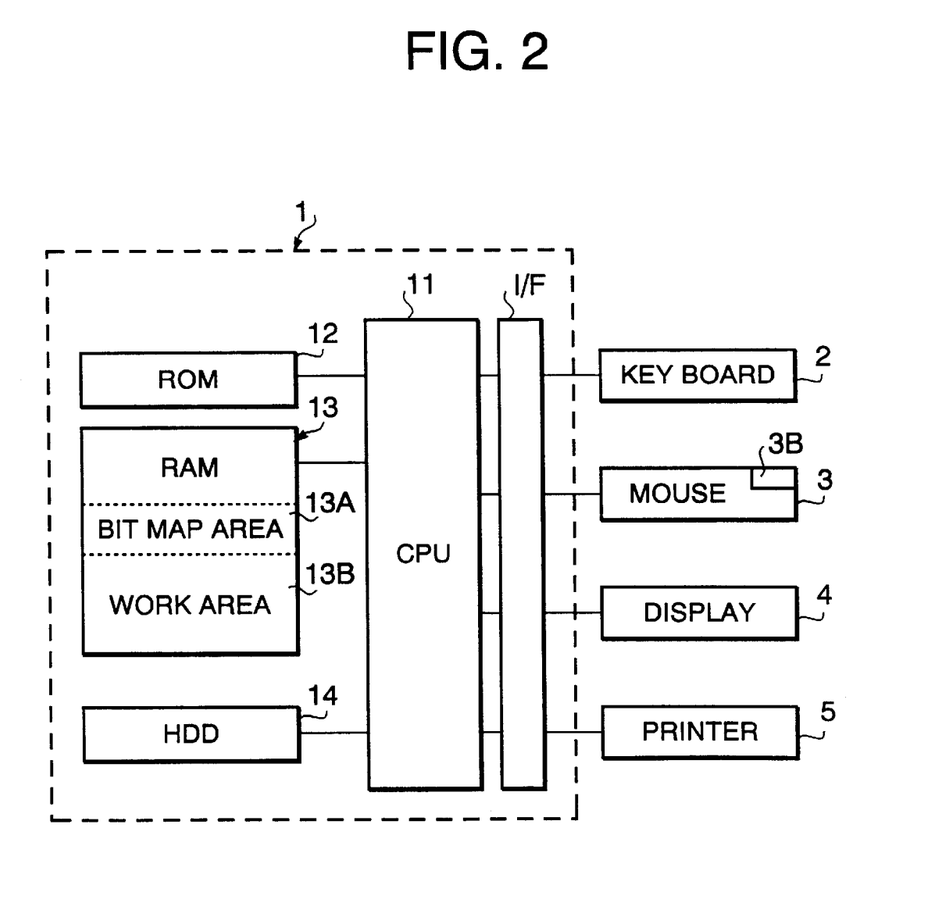
FIG. 2 is a block diagram of a control system of the composite picture editing device shown in FIG. 1.

FIG. 2 is a block diagram illustrating a control system of the composite picture editing device 100 shown in FIG. 1. The main body 1 includes a CPU (Central Processing Unit) 11, a ROM (Read Only Memory) 12, a RAM (Random Access Memory) 13, an HDD (Hard Disk Drive) 14, and the like.

The CPU 11 controls the entire operation of the composite picture editing device 100 by executing various programs stored in the ROM 12. In the embodiment, an image of a face (or an upper part of the body, or the like) is divided into a plurality of picture components, each picture component having a plurality of candidate patterns. One of the candidate patterns for each component is selected by an operator. The selected picture patterns for respective components are combined to form the composite image. The candidate patterns are stored in the ROM 12 as a pattern data.

The RAM 13 includes a bit map area 13A for storing the candidate patterns for each component for display as a bit map data, and a work area 13B for temporarily storing data currently processed. The composite picture created by the composite picture editing device 100 can be stored as a data file in the HDD 14. Alternatively, by a cut-and-paste operation, which is well known in a field of image data processing, the created picture can be incorporated in a document data as an object, or can be printed out by the printer 5.

Various control commands can be input through the keyboard 2 when the composite picture is created. Further, with use of the mouse 3, selection of one of the candidate patterns displayed on the display 4, or selection of a menu can be done. By moving the mouse 3 on a desk, moving amount and direction are input to the CPU 11 through the interface I/F. By pressing a mouse button 3B provided on the mouse 3, a predetermined signal is input to the CPU 11 through the interface I/F.

The CPU 11 displays an image corresponding to the program being executed, and further a mouse pointer (not shown) on the display 4. The displayed position of the mouse pointer on the display 4 changes as the mouse 3 is moved on the desk.

In the description hereinafter, an operation such that positioning the mouse pointer on a dot or an area on the display 4 and pushing the mouse button 3B and releasing the mouse button 3B immediately is defined as a click operation. For example, when the description says that "a button is clicked", it means that the mouse pointer is positioned on "a button" displayed on the display 4, and then the mouse button 3B is pushed and released immediately.

Figure 3:
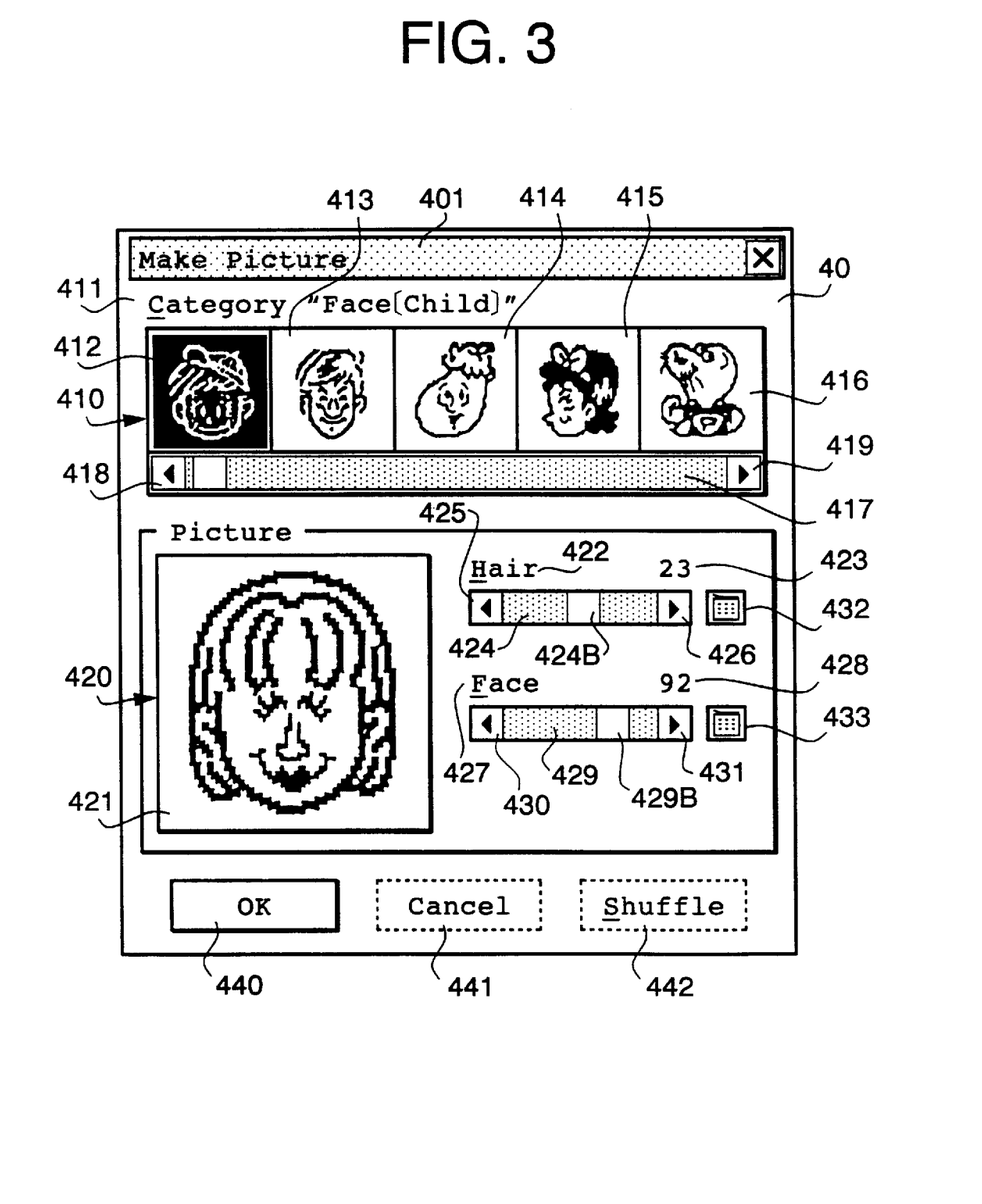
FIG. 3 is a screen image of a picture edit window.

When the CPU 11 starts an composite picture editing program, an image editing window 40 as shown in FIG. 3 is displayed on the screen 4S of the display 4. The displayed position of the screen 4S can be changed on the screen 4S. In order to change the position of the image editing window 40, the mouse pointer is positioned on a title bar 401 of the image editing window 40, and move the mouse 3 with holding the mouse button depressed.

The image editing window 40 includes a category display area 410 and a composite image display area 420. The category display area 410 indicates a category, or a type of the composite picture to be edited. In the embodiment, ten different categories are provided, and for respective categories, small pictures representing the categories (for example, 412–416) are displayed in the category display area 410.

In the drawing, the category 412 represents a face of a child, the category 413 represents a face of an adult, the category 414 represents a face of personified animals or vegetables, the category 415 represents a face in profile, and the category 416 represents a combination of a face and an upper body.

In FIG. 3, five categories as described above are shown in the category display area 410. When a scroll button 418 or 419 provided at the ends of a scroll bar 417 is clicked, pictures indicative of the categories are scrolled in a direction indicated by an arrow formed on the scroll button 417 or 418, and the other pictures representing the other categories appear. By clicking one of the displayed pictures in the category display area 410, the operator can select a category represented by the clicked picture.

FIG. 3 shows a situation in which the picture of a child has been clicked and the category 412 (a child face) is selected. As shown in FIG. 3, a displayed condition of the picture corresponding to the selected category is different from the displayed condition of the other pictures. Further to the above, the name of the selected category is indicated above the picture display by letter indication 411.

When a category is selected, all the pattern data related to the selected category are read out of the ROM 12 and converted into the bit map data, which is stored in the bit map data area 13A of the RAM 13. Note that all the pattern data related to the selected category includes data of all the picture components to be used for the composite picture of the selected category, each picture component including a plurality of candidate patterns.

The operator is then allowed to select one of a plurality of patterns for each component of the composite picture according to the selected category. The resultant image, i.e., the composite picture is displayed in a composite picture display window 421 of a composite picture display are 420.

Specifically, when a category is selected by selecting a picture displayed in the category display area 410, a default picture for the selected category is firstly displayed in the composite picture display window 421. On the right-hand side of the composite picture display window 421 in FIG. 3, scroll bars 424 and 429 for respectively changing pictures of the patterns for respective components which form the composite picture are displayed.

In the embodiment, when a child face (category 412) or an adult face (category 413) is selected as a composite picture to be composed, a hair style (including an outline of a face) and a look of the face can be changed as components. On the upper side of the scroll bar 424 in the drawing, a name of one of the components "Hair" is indicated, and on the upper side of the scroll bar 429, another name of the component "Face" is indicated.

In order to change the hair component from the currently selected one to another, the operator may click a scroll button 425 or 426, or drag a scroll box 424B along the scroll bar 424. Note "to drag the scroll box 424B" is to position the mouse pointer on the scroll box 424B, press the mouse button 3B, and move the mouse with holding the mouse button 3B depressed. As the patterns for the component are changed, the changed result is immediately reflected on the picture shown in the composite picture display window 421. That is, for example, as the pattern of the hair component is changed with use of the scroll bar 424, the pattern of the hair component displayed on the window 421 changes one by one. While the pattern for the hair component is changing, the pattern of the face remains as is. The operator can stop scrolling when a desired pattern is displayed on the composite picture display window 421.

On the upper right-hand side of the scroll bar 424, a number 423 (the value of which is "23") indicating the currently selected pattern for the hair component is displayed, as shown in FIG. 3. In this example shown in FIG. 3, the number of the selected pattern for the hair component is "23". Similarly, on the upper right-hand side of the scroll bar 429, the number 428 (value of which is "92") indicating the currently selected pattern for the face component is displayed. In this example shown in FIG. 3, the number of the selected pattern for the face component is "92". These numbers "23" and "92" change as the patterns for the components are changed. Similarly to the hair component, the pattern for the face component can be changed by clicking the scroll buttons 430, 431 and/or by dragging a scroll box 430B of the scroll bar 427. When the pattern of the face component is changed, the pattern of the face in the composite picture shown in the composite picture display window 21 changes, and the pattern of the hair component remains as is. When the operator stops changing the pattern of the face component, the pattern currently displayed in the composite picture display window 21 is selected.

In the foregoing description, selection of the patterns for the components with use of the scroll bars, and composite picture display window 421 in which the composite picture is displayed, is described.

Next, a collective display of a plurality of candidate patterns (i.e., a simultaneous display of the plurality of candidate patterns) will be described.

As shown in FIG. 3, on the right-hand side of the scroll bars 424 and 429, first and second library display buttons 432 and 433 are displayed.

Figure 4:
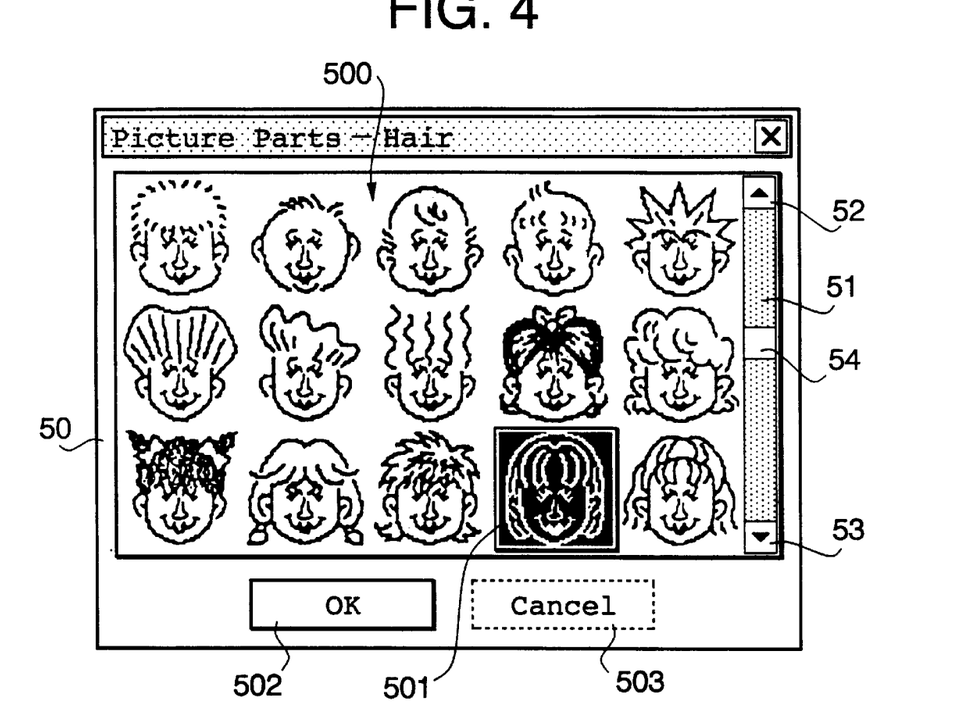
FIG. 4 is a screen image of a window in which a plurality of candidate patterns.

The first and second library display buttons 432 and 433 are for displaying windows showing a plurality of patterns. When the first library display button 432 is clicked, a library display window 50 shown in FIG. 4 is displayed. In the library display window 50, a plurality of patterns for the hair component are shown at the same time with being combined with the currently selected pattern for the face component.

If only the patterns for the corresponding component are displayed, and patterns for the other components are not combined in the library display window, it may be difficult for the operator to imagine the resultant composite picture, and it would be difficult to select the appropriate pattern from the library display window. In this embodiment, on the contrary, since the patterns for the other components are combined with the candidate patterns displayed in the library display window 50, the operator can determine the pattern to be selected easily. Selection of a pattern from among the displayed candidate patterns 500 is done only by clicking on the pattern to be selected. The selected pattern 501 is displayed highlighted as shown in FIG. 4.

In case the library display window 50 displays only a part of the candidate patterns, a scroll bar 51 associated with the scroll buttons 52 and 53, and a scroll box 54 is displayed. By clicking the scroll buttons 52 and 53, and/or dragging the scroll box 54, the hidden candidate patterns appear in the library display window 50.

After a pattern for the hair component is selected in the library display window 50 as described above, and an OK button 502 is clicked, the library display window 50 disappears and the selected pattern is applied to the composite picture that is shown in the composite picture display window 421 of the composite picture editing window 40 shown in FIG. 3. If a cancel button 503 in the library display window 50 is clicked, the library display window 50 disappears, and the composite picture shown in the window 421 remains as it was before the library display window 50 was opened.

Although drawings will be omitted due to the similarity, it should be noted that when the library display button 433 is clicked, another library display window 50 showing a plurality of candidate patterns for the face component is displayed. Each of the candidate patterns is combined with the currently selected patterns for the other components. Accordingly, the operator can determine the appropriate pattern for each picture component easily.

After the composite picture is edited as described above, and when an OK button 440 of the composite picture editing window 40 is clicked, the image displayed in the window 421 is established as a final picture. In this case, if the picture editing process is executed as a sub-process when a parent process (another program) is executed, the image data of the established picture may be incorporated in the data processed by the parent process. For example, the picture edit process is called when a text is input with an word processing program, the image data of the established picture may be pasted within the text automatically. If the picture edit process is executed as an stand-alone process, the image data may be recorded on the HDD 14 as a data file.

In the above-described embodiment, the composite picture consists of only two components: the hair component; and the face component. However, the invention does not limit the number of the components, and the composite picture may consist of three or more components. Even if the number of the components is more than two, the similar process can be performed to create a desired composite picture. When the number of the components is more than two, it is preferable that when the library display window is displayed, each pattern is combined with the patterns for all of the other components.

If a cancel button 441 is clicked, the composite picture is not established, and accordingly, the image data corresponding to the composite data will not be incorporated in a data processed by the parent process, or will not be written on the HDD 14. If a shuffle button 442 is clicked, a pattern for each component corresponding to the currently selected category is selected at random, and combined. The composite image thus created is displayed in the window 421. Alternatively, control may be modified such that, when the shuffle button 442 is clicked, a pattern for each component is selected at random regardless of the category, and combined. Further, control may be modified such that a plurality of composite images may be created with use of a shuffling function described above at a time and displayed in the library display window 50.

Further alternatively, control may be modified such that a predetermined candidate patterns for a component is selected from among all candidate patterns for all categories randomly, and then the selected candidate patterns belonging to various categories are displayed in the library display window 50. Still alternatively, control may be modified such that not only the candidate patterns shown in the library display window 50 but also the components to be combined with the candidate patterns may be selected randomly from among all patterns for all categories when the shuffle button 422 is clicked.

Figure 5:
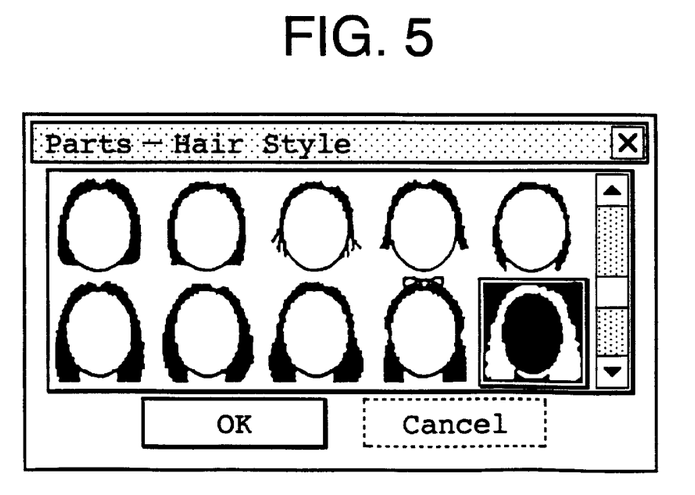
FIG. 5 is a screen image of a window in which a plurality of candidate patterns combined with a null pattern for the face component.

It should be noted that the candidate patterns for each component includes a null image pattern, i.e., a pattern which does not have image at all. For example, for a composite picture consisting of the hair component and the face component, if the null image pattern is selected for the face component and the library display window for the hair component is displayed, only the patterns for the hair component are shown in the window as shown in FIG. 5. This type of display has been employed in conventional composite picture editing devices. Having this type of display is advantageous. If the operator intends to select a pattern of a certain component without referring to the other components, by selecting the null image pattern of the other components, the purpose can be achieved easily.

Figure 6:
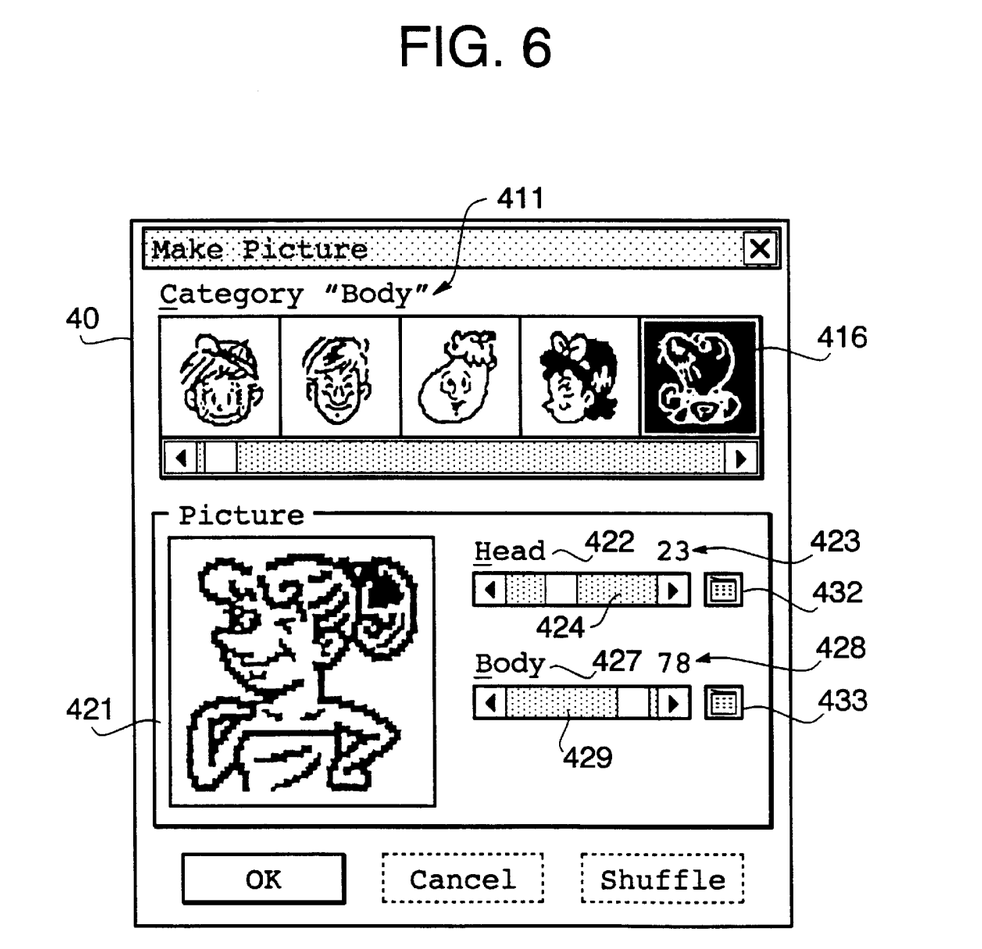
FIG. 6 is a screen image of the composite image editing window.

FIG. 6 shows the composite picture edit window 40 when the category 416 ("upper body") is selected. On the category indication portion 411, the letter "Body" is displayed to indicate the selected category. Further, the displayed condition of the picture corresponding to the category 416 in the category window 416 is also made different from the other pictures in the window 416. If the window 40 is displayed in color, the displayed condition could be different by color, and if the window 40 is a monochrome display, the displayed condition may be made different by highlighting the selected category.

As shown in FIG. 6, in the composite picture window 421, a picture of an upper body is displayed. In this embodiment, the composite picture of the upper body consists of a head component and a body component. On the upper side of the scroll bar 424 which is displayed on the right-hand side of the window 421, the name of the component "Head", and a number 423 (a value of which is "23") indicating the currently selected pattern for the head component is displayed. On the upper side of the scroll bar 429, the name of the other component "Body" and the number 428 (a value of which is "78") indicating the currently selected pattern for the body component is displayed.

Figure 7:
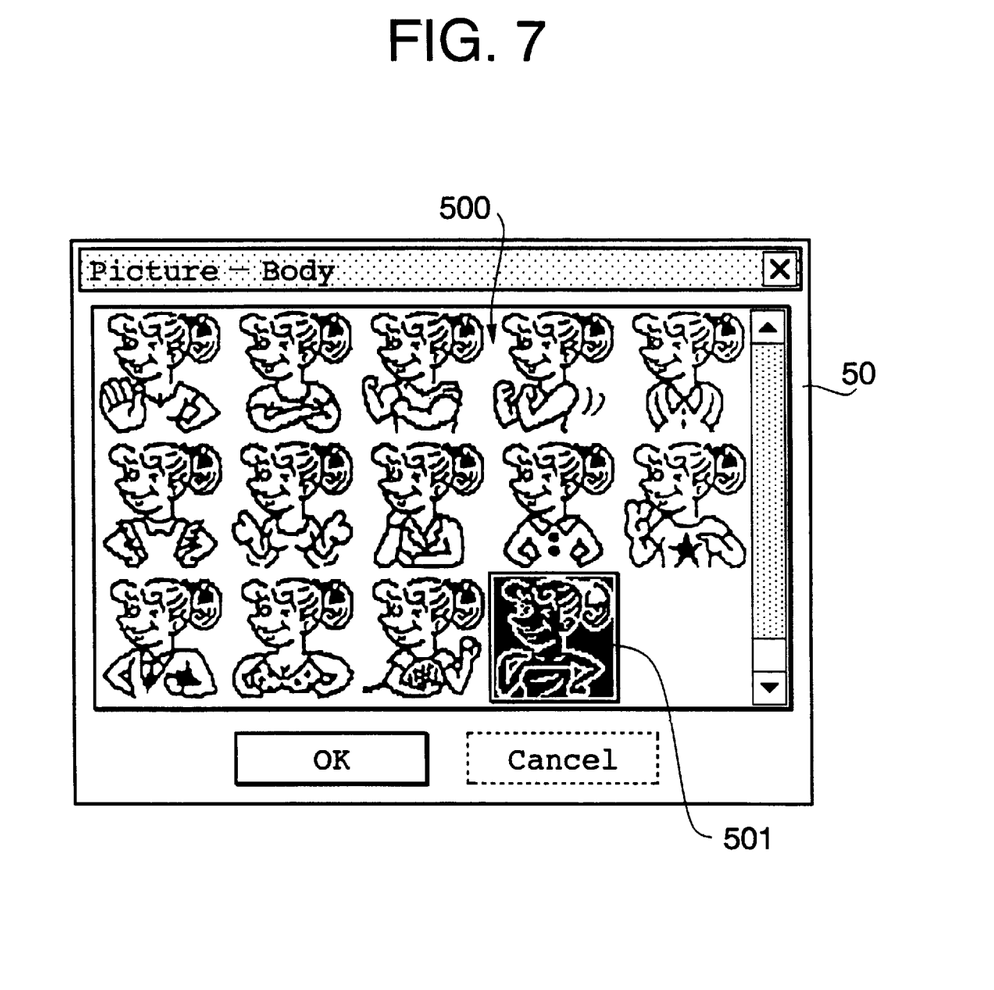
FIG. 7 is a screen image of the candidate patterns for a body component.

If the library display button 433 is clicked when the window 40 shown in FIG. 6 is displayed, the library display window 50 showing a plurality of patterns for the body component as shown in FIG. 7 is displayed. As shown in FIG. 7, in the window 50, each of the candidate patterns is combined with the currently selected pattern for the head component. Since the operator can view the entire image of the composite picture, it is easier to determine a pattern in the window 50 in comparison to the case in which only the patterns for the component are displayed without the pattern for the head component. As described before with reference to FIG. 4, by clicking on a desired pattern, selection of the pattern is made. The selected pattern is displayed as being highlighted.

Figure 8:
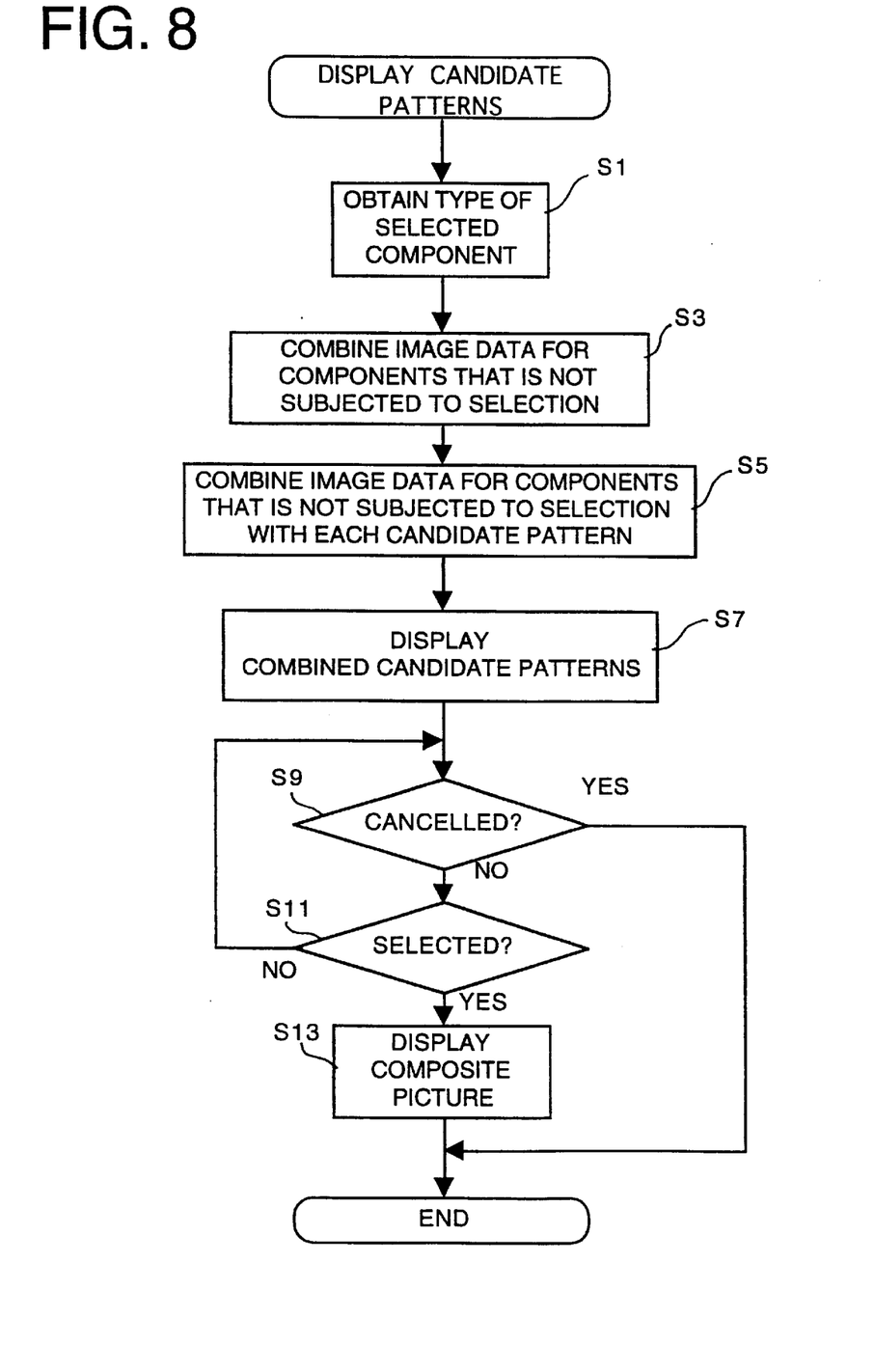
FIG. 8 is a flowchart illustrating a candidate pattern displaying process.

FIG. 8 shows a flowchart illustrating a process when the library display button 432 or 433 is clicked. The process is executed by the CPU 11.

When the operator clicks the library display button 432 or 433, the CPU 11 determines which component is selected at step S1 (hereinafter, referred to as S1, S2, ... ). For example, in a situation in which the window 40 shown in FIG. 3 is opened, the CPU 11 determines that the hair component of the child face category is selected if the library display button 432 is clicked, and that the look component of the child face category is selected if the library display button 433 is clicked.

Then, at S3, the CPU 11 reads bit map data of the patterns for the components other than that selected at S1 from the bit map area 13A of the RAM 13, and generate a combined bit mat data. Note that the combined bit map data generated as S3 does not include the bit map data of the pattern of the component selected at S1.

At S5, the CPU 11 reads data of all the patterns for the component selected at S1 from the bit map area 13A, and combine each of the data of all the patterns with the combined bit map data to generate combined pattern image data. The combined pattern image data is displayed on the library display window 50 as a plurality of candidate patterns each combined with the currently selected patterns for the other components at S7 (see FIGS. 4 and 7).

If the operator clicks the cancel button 503 (S9:YES), the CPU 11 skips the steps following S7, and finishes the process shown in FIG. 8. Although not shown in FIG. 8, when the process shown in FIG. 8 is finished, the window 50 disappears.

If the operator 502 clicks the OK button 502 when a patter is selected (S11:YES), the CPU 11 combines the bit map data of the selected pattern (i.e., the pattern which is highlighted when the OK button 502 is clicked) with the currently selected patterns for the other components to generate a bit map data of the composite picture, and display the composite picture in the window 421 (S13).

As described above, according to the composite picture editing device, when a library display window showing a plurality of candidate patterns for a component is displayed, each pattern is combined with the currently selected patterns for the other components. Therefore, the operator can determine an appropriate one of the candidate patterns for the component, and accordingly the composite picture can be created easily.

It should be noted that the invention does not limit the composite picture to the picture of a face, body, head or the like. As far as the composite picture consisting of a plurality of components, and each component has a plurality of candidate patterns, the invention can be applied.

The present disclosure relates to subject matter contained in Japanese Patent Application No. HEI 08-180080, filed on Jun. 20, 1996, which is expressly incorporated herein by reference in its entirety.

What is claimed is:

1. A composite picture editing device for processing a composite picture consisting of a plurality of components, at least one of said components having a plurality of candidate patterns, one of said plurality of candidate patterns being selected to compose said composite picture, said composite picture editing device comprising:

a display;

an image combining system, which generates a plurality of combined images, each of said combined images comprising an image of one of said plurality of candidate patterns and an image of said candidate patterns for other components having been previously selected, each of said combined images having the same image of said previously selected candidate patterns;

a display controller, which controls said display to simultaneously display said plurality of combined images; and a selector which is manually operated to select one of said combined images displayed on said display.

2. The composite picture editing device according to claim 1, wherein all of said plurality of components respectively have a plurality of candidate patterns, one of said plurality of candidate patterns for each component being selected to compose said composite picture.

3. The composite picture editing device according to claim 2, wherein said image combining system generates said plurality of combined images by combining image of each of said plurality of patterns for only one of said components with currently selected patterns for the other components at a time.

4. The composite picture editing device according to claim 1, wherein said plurality of patterns for each of said plurality of components includes a null image pattern containing no images.

5. The composite picture editing device according to claim 1, wherein said selector comprises a manually movable mouse and a mouse pointer displayed on said display, said mouse pointer being moved on any one of said combined images displayed on said display as said mouse is moved.

6. The composite picture editing device according to claim 2, wherein said display controller controls said display to display said composite image consists of currently selected candidate patterns for said plurality of components.

7. The composite picture editing device according to claim 6, wherein said display controller displays scroll bars corresponding to said plurality of components, wherein when one of said scroll bars is operated, currently selected candidate pattern of said composite picture corresponding to the operated ones of said scroll bars are replaced with another candidate pattern.

8. The composite picture editing device according to claim 1, which is capable of processing a plurality of categories of composite pictures, a plurality of different sets of components being provided corresponding to said plurality of categories.

9. The composite picture editing device according to claim 8, wherein said image combining system combines image of one of said plurality of candidate patterns for each component at random, and said display controller controls said display to display said composite picture consists of candidate patterns selected at random for respective components.

10. A composite picture processing device for processing a composite picture consisting of a plurality of picture components, each of said plurality of picture components having a plurality of candidate patterns, said composite picture consisting of selected patterns of said plurality of said candidate patterns for said plurality of picture components, said composite picture processing device comprising:

a display;

an image combining system, which generates a plurality of combined images, each of said combined images comprising an image of one of said plurality of candidate patterns for one of said plurality of picture components that is subjected to a selection and an image of said candidate patterns for each of said plurality of picture components having been previously selected, each of said combined images having the same image of said previously selected candidate patterns;

a display controller, which controls said display to simultaneously display said plurality of combined images generated by said image combining system; and a selector which is manually operated to select one of said combined images displayed on said display.

11. The composite picture editing device according to claim 10, wherein said plurality of patterns for each of said plurality of components includes a null image pattern containing no images.

12. The composite picture editing device according to claim 10, which is capable of processing a plurality of categories of composite pictures, a plurality of different sets of components being provided corresponding to said plurality of categories.

13. The composite picture editing device according to claim 12, wherein said image combining system combines image of one of said plurality of candidate patterns for each component at random, and said display controller controls said display to display said composite picture consists of candidate patterns selected at random for respective components.

14. A method of displaying a plurality of candidate patterns for at least one of a plurality of components composing a composite picture for an operator to select, said method comprising:

obtaining a first image data of said candidate patterns which have been selected for each of said plurality of components except said at least one of said plurality of components;

obtaining a second image data for each of said plurality of candidate patterns for said at least one of said plurality of components, combining said first image data with each of said second image data of each of said plurality of candidate patterns; and displaying said candidate patterns simultaneously, each of which having been combined with a same image corresponding to said first image data.

15. The method according to claim 14, wherein said plurality of candidate patterns for each of said plurality of components includes a null image pattern containing no images.

16. The method according to claim 14, wherein said composite picture includes pictures at a plurality of categories, wherein said plurality of candidate patterns include a plurality of candidate patterns in said plurality of categories, and said step of obtaining the second image data for each of said plurality of candidate patterns obtains the second image data in said plurality of categories at random.

17. The method according to claim 16, wherein said step of obtaining the first image data of said image pattern selects said plurality of components from among candidate patterns for said plurality of categories at random.

* * * * *